April 7, 1925.  
A. R. ADAMS  
1,532,852  
RESERVE SUPPLY TRAPPING MEANS FOR GASOLINE TANKS  
Filed April 10, 1924
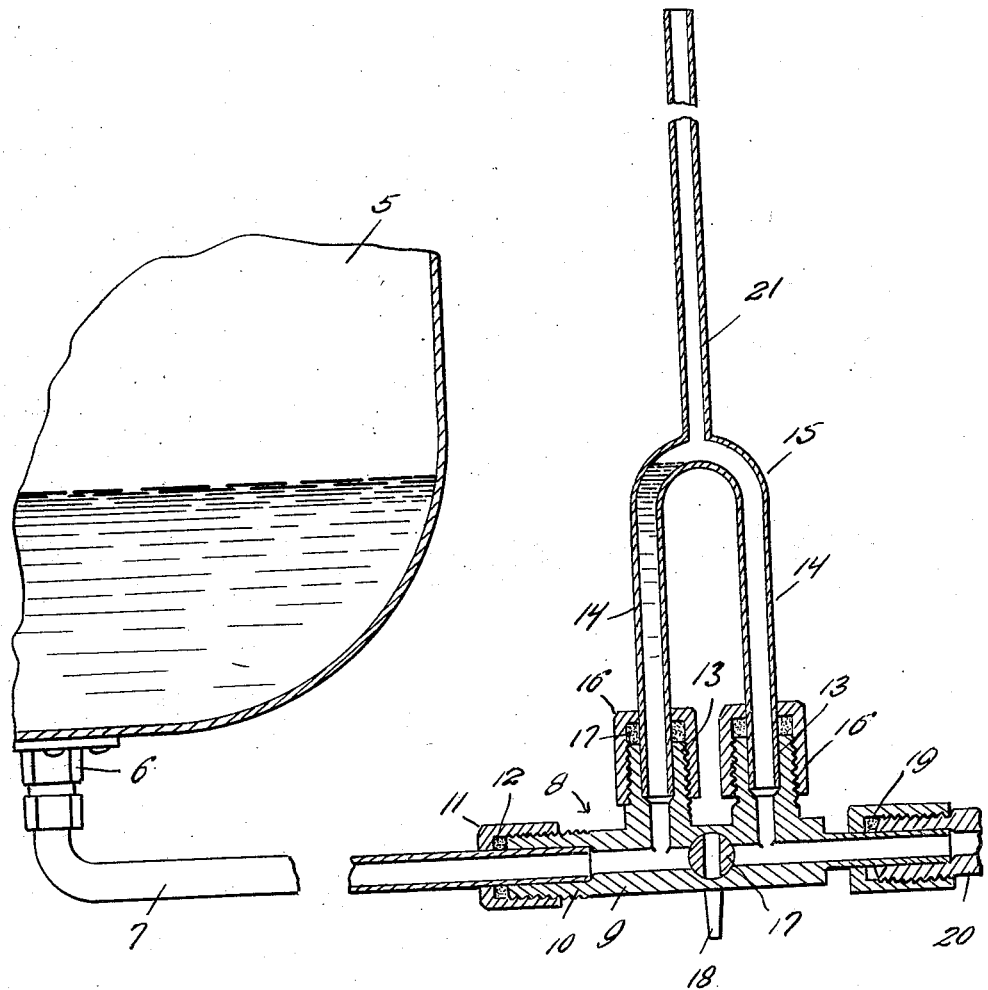
A. R. Adams,  
Inventor
By Clarence A. O'Brien  
Attorney Patented Apr. 7, 1925.

1,532,852

UNITED STATES PATENT OFFICE.

ALFRED R. ADAMS, OF DETROIT, MICHIGAN.

RESERVE-SUPPLY-TRAPPING MEANS FOR GASOLINE TANKS.

Application filed April 10, 1924. Serial No. 705,561.

*To all whom it may concern:*

Be it known that I, ALFRED R. ADAMS, a citizen of the United States, residing at Detroit, in the county of Wayne and State of Michigan, have invented certain new and useful Improvements in Reserve-Supply-Trapping Means for Gasoline Tanks, of which the following is a specification.

This invention relates generally to fuel supply tanks for vehicle engines, and has more particular reference to a means whereby a reserve supply of the fuel may be trapped within the tank, in order that the same may be used, in the operation of the vehicle motor, when the main supply has become exhausted.

The primary object of the present invention resides in the provision of a means whereby a reserve supply of the fuel may be trapped within the tank, for use after the main supply has become exhausted, that is attachable directly to the fuel line of the vehicle at any desirable point thereon, and that is so constructed as to enable this reserve supply to pass freely to the carburetor or vacuum tank of the vehicle engine.

A still further object is to provide means of the above character that is in the form of a single fitting that may be easily and cheaply inserted within the fuel supply line, and this without requiring any great skill.

A further and important object is to provide means of the foregoing character that may be manufactured and marketed at small cost, and one wherein the life of the same will be as great as the life of the vehicle itself.

With the foregoing and other objects in view, as the nature of the invention will be better understood, the same comprises the novel form, combination and arrangement of parts hereinafter more fully described, shown in the accompanying drawing and claimed.

In the drawing,

The figure is a detailed vertical longitudinal sectional view of a reverse supply trapping means for gasoline tanks, constructed in accordance with the present invention, the same being shown as actually applied.

Now, having particular reference to the drawing, 5 indicates a vehicle engine fuel supply tank, of any shape or construction, that is equipped with the usual outlet nipple 6, with which is associated one end of a fuel feed line 7.

My invention per se constitutes the provision of a fitting that is designated generally 8, the same including preferably a straight tight section, that is externally screw threaded, at one end, as at 10, and adapted for reception of the end of the fuel pipe line 7, at said screw threaded end 10. This screw threaded end of the pipe section carries a packing gland 11, whereby a packing washer 12, between this end of the pipe section, and the adjacent end of the gland may be compressed for effecting a leak proof joint between the gasoline line 7, and said pipe line of the fitting 8.

Adjacent the other end of said pipe section 9, the same is formed with a pair of spaced vertically extending externally screw threaded nipples 13—13 that have communication with the passageway through said pipe section 9. Adapted for engagement within these nipples 13—13 are the ends of the spaced parallel legs 14—14 of an inverted substantially U-shaped metal pipe 15, of desirable length. Glands 16—16 are also adapted for engagement upon said externally screw threaded nipples 13, for compressing washers 17, between the ends of these nipples and said glands for creating leak-proof joints between the legs 14—14 of the pipe 15 and said nipples 13—13.

Intermediate the said spaced vertically extending nipples 13—13 said pipe sections 19 of the fitting 8 is equipped with a suitable control valve, 17, that may be operated by a handle 18, externally of said pipe section 9.

The other end of this pipe section 9 is formed with an extension 19, that is adapted for attachment with a conveying pipe 20, that leads to the carburetor or vacuum tank of the vehicle engine.

The inverted relatively U-shaped pipe 15 may be, and preferably is provided with an air vent pipe 21, that has communication with both of the legs 14—14 of said inverted relatively U-shaped pipe.

In view of the foregoing, it will at once be apparent that when the valve 17 is in the position shown in the figure, the gasoline will necessarily have to pass into the pipe section 9 of the fitting 8, and then upwardly through the first nipple 13 into a leg of the inverted U-shaped pipe 15, and then over into the other leg 14 of the pipe 15, before the same can finally pass into the pipe 20, to be led to the vacuum tank or carburetor. It will thus be apparent that fuel will be trapped within the tank 5, to a height equivalent to the height of the inverted U-shaped pipe 15, with respect to the tank 5. Whenever the main supply of gasoline becomes exhausted it will only be necessary to turn the handle 18 for opening the valve, for manifestly allowing the gasoline to pass directly through the pipe section 9 of the fitting, into the conveying pipe 20. Numerous advantages of a reverse supply trapping means for gasoline tanks of the present nature will be at once apparent to those skilled in the art, and even though I have herein shown and described the most practical embodiment of the invention, with which I am at this time familiar, it is nevertheless to be understood that minor changes may be made in the invention, without departing from the spirit and scope of the appended claim.

Having thus described my invention, what I claim as new and desire to secure by Letters Patent is:

A reserve supply trapping means for gasoline tanks wherein the tank has an outlet from the bottom, and a gasoline feed pipe extending substantially horizontally therefrom comprising a cast body member having a horizontally arranged tubular section formed with an axial bore having an enlarged portion at one end for receiving the end of said feed pipe, a packing gland threaded on said end of the section to form a liquid tight joint with said pipe, the other end of the section having a reduced external diameter for receiving another feed pipe connection thereon, the central portion of the section of the body member having spaced parallel upstanding nipples formed thereon, and provided with bores communicating with said axial bore, and enlarged at the end portions to form sockets, an inverted Y-shaped pipe member having the similar adjacent ends positioned and mounted in said pockets of said nipples on the body member, and secured therein, in fluid tight relation, the outer end of said pipe member extending upwardly above the horizontal plane of the top of the tank, and a valve in said body member controlling the passage through the axial bore therein between said nipples, said Y-shaped pipe member trapping a predetermined quantity of gasoline in the tank, and providing a by-pass in the feed pipe around said valve.

In testimony whereof I affix my signature.

ALFRED R. ADAMS.